United States Patent
Huber

(10) Patent No.: US 11,506,891 B2
(45) Date of Patent: Nov. 22, 2022

(54) METHOD FOR OPERATING A VISUAL FIELD DISPLAY DEVICE FOR A MOTOR VEHICLE

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/255,174

(22) PCT Filed: Jul. 22, 2019

(86) PCT No.: PCT/EP2019/069672
§ 371 (c)(1),
(2) Date: Dec. 22, 2020

(87) PCT Pub. No.: WO2020/035264
PCT Pub. Date: Feb. 20, 2020

(65) Prior Publication Data
US 2021/0271077 A1 Sep. 2, 2021

(30) Foreign Application Priority Data
Aug. 16, 2018 (DE) ...................... 10 2018 213 820.6

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1529* (2019.05);
(Continued)

(58) Field of Classification Search
CPC ... G02B 27/01–0189; G02B 2027/0105–0198; G03B 21/00–64; H04N 9/31–3197
See application file for complete search history.

(56) References Cited

U.S. PATENT DOCUMENTS

2003/0107803 A1 6/2003 Tanaka et al.
2009/0122138 A1 5/2009 Bischoff et al.
(Continued)

FOREIGN PATENT DOCUMENTS

CN 106657717 A 5/2017
CN 107465905 A 12/2017
(Continued)

OTHER PUBLICATIONS

International Search Report (PCT/ISA/210) issued in PCT Application No. PCT/EP2019/069672 dated Mar. 23, 2020 with English translation (nine (9) pages).
(Continued)

*Primary Examiner* — Christopher A Lamb, II
(74) *Attorney, Agent, or Firm* — Crowell & Moring LLP

(57) ABSTRACT

A method operates a visual field display device, particularly for a motor vehicle, which includes an autostereoscopic planar pixel array for generating a projecting light beam containing a display content, and is designed to project this onto a partially transparent, reflective projection screen, particularly a front windscreen of the motor vehicle, in such a way that a virtual display image superimposed into a field of vision of a user is generated behind the screen. The method provides at least one surroundings parameter and/or user parameter, and switches between at least two qualitatively different 3D, 2D and/or monocular operating modes of the planar pixel array, depending on the surroundings parameters and/or user parameters provided, in order to adapt the virtual display image to qualitative operational changes
(Continued)

relating to the surroundings and/or the user of the visual field display device.

15 Claims, 8 Drawing Sheets

(52) U.S. Cl.
CPC .. *B60K 2370/166* (2019.05); *B60K 2370/167* (2019.05); *B60K 2370/169* (2019.05); *B60K 2370/178* (2019.05); *B60K 2370/349* (2019.05); *B60K 2370/741* (2019.05); *G02B 2027/014* (2013.01); *G02B 2027/0118* (2013.01); *G02B 2027/0134* (2013.01)

(56) References Cited

U.S. PATENT DOCUMENTS

| | | |
|---|---|---|
| 2010/0073636 A1 | 3/2010 | Sasaki et al. |
| 2015/0077820 A1* | 3/2015 | Someno ............ G02B 27/0103 359/11 |
| 2015/0138327 A1 | 5/2015 | Xu |
| 2015/0268479 A1 | 9/2015 | Woodgate et al. |
| 2016/0173867 A1* | 6/2016 | Ichihashi ............... G02B 30/30 348/54 |
| 2017/0123215 A1* | 5/2017 | Li ........................... G06F 3/038 |
| 2017/0330383 A1 | 11/2017 | Van Laack |
| 2017/0351107 A1 | 12/2017 | Seder et al. |

FOREIGN PATENT DOCUMENTS

| | | | |
|---|---|---|---|
| CN | 108292047 A | 7/2018 | |
| DE | 602 05 312 T2 | 5/2006 | |
| DE | 10 2004 058 683 A1 | 6/2006 | |
| DE | 10 2009 054 231 A1 | 5/2011 | |
| DE | 10 2009 054 232 A1 | 5/2011 | |
| DE | 10 2014 012 937 A1 | 3/2015 | |
| DE | 10 2015 222 842 A1 | 5/2017 | |
| DE | 102015222842 A1 * | 5/2017 | ......... G02B 27/0018 |
| DE | 10 2016 108 878 A1 | 11/2017 | |
| DE | 10 2017 112 190 A1 | 12/2017 | |
| DE | 10 2016 215 820 A1 | 3/2018 | |
| DE | 10 2017 211 507 A1 | 1/2019 | |
| EP | 2 595 397 A2 | 5/2013 | |
| JP | 8-85363 A | 4/1996 | |
| WO | WO 2018/019600 A1 | 2/2018 | |

OTHER PUBLICATIONS

German-language Written Opinion (PCT/ISA/237) issued in PCT Application No. PCT/EP2019/069672 dated Mar. 23, 2020 (nine (9) pages).
German-language Search Report issued in German Application No. 10 2018 213 820.6 dated May 14, 2019 with partial English translation (14 pages).
Chinese-language Office Action issued in Chinese Application No. 201980042168.X dated Feb. 21, 2022 with English translation (20 pages).

\* cited by examiner

METHOD FOR OPERATING A VISUAL FIELD DISPLAY DEVICE FOR A MOTOR VEHICLE

BACKGROUND AND SUMMARY OF THE INVENTION

The invention relates to a method for operating a visual field display apparatus, in particular a head-up display for a motor vehicle, a corresponding control device and a motor vehicle equipped therewith. Here, the visual field display apparatus comprises an autostereoscopic planar pixel arrangement which, in particular, can be embodied as one or more autostereoscopic flat screens.

Visual field display apparatuses in a motor vehicle are known, in particular, by the term head-up display (HUD). Using this, display content, such as information about a speed limit, is superimposed into the visual field of the driver in front of the motor vehicle as a virtual display image such that the driver need not avert their gaze from the road. To this end, a visual field display apparatus typically comprises a projection unit which generates a projection light beam with desired display content by way of a display with a suitable projection optical unit housed below a dashboard upper side and which projects this projection light beam onto a partly transparent projection screen, for example the windshield of the motor vehicle, from where it is reflected to the driver.

In this conventional structure, the HUD has a relatively small field of view which, as a rule, only reaches just as far as the horizon and the distance of the virtual display image is defined by the optical structure of the projection unit. An increase in the field of view is prevented by the restricted installation space within the dashboard. In particular, the known projection optical unit requires much space in the vertical direction. The driver gazes, so to speak, into a telescope such that, to them, a close display image generated at the display in the HUD interior appears in the distance in front of the motor vehicle. Consequently, in a manner corresponding to an "opening of the telescope", only restricted solid angles in which the HUD display image can be superimposed on the view through the windshield are displayable. Contact-analog superimpositions, as known from augmented reality, for example, are not possible outside of this restricted solid angle.

Secondly, DE 10 2009 054 232 A1, for example, has disclosed a head-up display for displaying information in stereoscopic fashion in a motor vehicle, which comprises image generation means for generating two different individual images provided for the two eyes of an occupant and a display unit on which luminous spots are generable, the light beams of which being visible to the occupant as a result of mirroring at the windshield of the motor vehicle. Further, deflection means such as a matrix-like arrangement of small lenses, for example, are provided in the beam path between the display unit and the windshield, the deflection means deflecting the light beams from different luminous spots in different emission directions. Moreover, pixel assignment means ensure such an assignment of pixels of the individual images to luminous points in the display unit that the individual image provided for the left eye of the occupant is visible for said left eye and the individual image provided for the right eye of the occupant is visible for said right eye. An autostereoscopic display of this type can be particularly advantageous for a contact-analog representation of the content.

As a rule, visual field display apparatuses are provided with additional measures for suppressing the interfering reflections of ambient light at their components, the interfering reflections possibly leading to a blinding of the user. To this end, a covering panel, for example, which seals the projection unit to the outside geometrically prevents reflections (a so-called glare trap) in conventional HUDs. However, antireflection techniques known therefrom are not suitable for a display arranged directly opposite the windshield.

It is an object of the present invention to provide an operating method for a visual field display apparatus with an autostereoscopic display, in particular for a motor vehicle, which is improved, in particular, in view of the visibility of the virtual display image or the comfort of the user.

This object is achieved by method for operating a visual field display apparatus and by a corresponding control unit, a computer program, and a motor vehicle, according to the independent claims. Further configurations are specified in the dependent claims. All additional features and effects specified in the claims and the description for the method also apply in respect of the visual field display apparatus, the control unit, the computer program or the motor vehicle, and also vice versa.

According to a first aspect, a method for operating a visual field display apparatus, in particular for a motor vehicle, is provided, the visual field display apparatus comprising an autostereoscopic planar pixel arrangement for generating a projection light beam with display content. The visual field display apparatus is embodied to project the generated projection light beam on a partly transparent reflecting projection screen, in particular a windshield of the motor vehicle, in such a way that a virtual display image superimposed into a visual field of a user (e.g., of the driver or of any other occupant of the motor vehicle) is generated behind the projection screen. The method includes the following steps:

providing at least one surroundings and/or user parameter and switching between at least two qualitatively different modes of operation of the planar pixel arrangement, which comprise at least one stereoscopic mode of operation (also referred to as 3D representation) and/or at least one monoscopic mode of operation (also referred to as 2D representation) and/or at least one monocular mode of operation (i.e., with a representation only visible to one eye of the user in each case), on the basis of the surroundings and/or user parameter(s) provided, in order to adapt the virtual display image to qualitative changes in operation in relation to the surroundings and/or the user.

Here, the term "planar" means, very generally, that the pixel arrangement in the form of a two-dimensional pixel matrix extends over an area that, at least in regions, can be flat or else curved or arched. In particular, the planar pixel arrangement can be matched to arching of the upper side of the instrument panel of a motor vehicle where necessary, for example by virtue of being constructed in stepped or nested fashion from a plurality of smaller partial areas, such as, e.g., flat displays. The terms "qualitatively differently" and "qualitative change" refer to, in particular, a not purely quantitative difference between various operating parameters but such a change in the operation that fundamentally changes the perceivability and/or visibility of the virtual display image for the user.

Switching the planar pixel arrangement between the qualitatively different modes of operation can be realized, in particular, by a suitable, respectively different electrical actuation of the pixel matrix, for example in relation to the assignment of individual pixels to the image content to be generated. In particular, this relates to a transition from a 3D display to a 2D or monocular representation, or vice versa.

Autostereoscopic planar pixel arrangement can be embodied in a manner known per se for a 3D representation, for example as per DE 10 2009 054 232 A1. That is to say, such a planar pixel arrangement can be driven by an image-generating unit and/or a control unit in such a way that two different 2D images arrive at the left eye and the right eye of the user in order to bring about a spatial impression of the represented virtual display image for the user, directly in front of their eyes without auxiliary means such as 3D glasses, for example. In this way, representations perceived as three-dimensional for example can be generated for the driver of a motor vehicle at any distance from their eyes between approximately 1 m and infinity. Here, all convergence planes are realizable at the same time as a matter of principle, facilitating an immersion into a virtual 3D world.

For the 3D mode of operation described, it was found in the present case, as directly verifiable by experimentation, that at least for typical vehicle geometries with, e.g., approximately 120 cm distance between the planar pixel arrangement and the eyes of the driver the eyes are independently able to substantially see the structures such as, e.g., lines superimposed as a virtual display image in focus, both at day and at night, in the case of an accommodation from far to infinite. Expressed differently, although there is a mismatch between convergence distance and accommodation distance, this is not perceived as bothersome.

Here, the convergence angle is an angle formed by the viewing axes of the right eye and the left eye and accommodation is the focused position of the lens of the eye at a distance of the object observed. In the case of normal vision (i.e., without a 3D display), the convergence angle and the accommodation distance correlate in accordance with a closed triangle. Provided that, in the present case, the 3D distance caused by the stereoscopic image generation is less than or equal to the distance of real background objects in the surroundings, in particular, the superimposed virtual display image can be observed in relaxed fashion and largely in focus; i.e., the eyes automatically set the correct 3D convergence for this case (cf. FIG. 10a-10c). (The term "substantially" herein can mean, in particular, a production or structure-caused possible deviation within the scope of the presented functional principle which, for example, might be no more than approximately 10% of relevant suitable measured variables).

In particular, the provision of at least one surroundings parameter can comprise the capture of current surroundings behind the projection screen, in particular surroundings in front of the motor vehicle. Here, the planar pixel arrangement is switched from a 3D mode of operation to a monocular mode of operation, at least in regions, if the spatial depth is not ascertainable in a predefined manner for a corresponding region of the captured surroundings in the background of the virtual display image. By way of example, when the motor vehicle passes through a tunnel, crosses a bridge and/or travels behind a truck up ahead, the extent of the depth of the space in front of the motor vehicle and behind the symbol might not be sufficiently clear or unique to the system and/or the user, as would be required for the 3D representation of a virtual symbol. By switching a corresponding region of the planar pixel arrangement into the monocular mode of operation, it is possible to maintain a current contact-analog position of the symbol; the symbol then is only visible to one eye of the user and therefore requires no depth recognition or adjustment of the convergence angle. Suitable means for capturing the surroundings in these and other method configurations, e.g., optical cameras or radar/lidar systems, are known to a person skilled in the art and often provided on board of the motor vehicle in any case.

In particular, the provision of at least one user parameter comprises the capture and/or user-side input of the user's age and/or visual impairment. In so doing, the planar pixel arrangement is switched from a 3D mode of operation to a 2D and/or monocular mode of operation, at least in regions, if the captured and/or entered user parameters in respect of age and/or visual impairment do not meet predefined requirements for the 3D representation for a corresponding region of the virtual display image. As an alternative or in addition thereto, a direct selection option between the aforementioned modes of operations can be provided to the user by way of a suitable user interface.

By way of example, this configuration of the method renders it possible to take account of the fact that elderly drivers may wear varifocals, which in contrast to younger drivers may possibly lead to a mismatch of the aforementioned convergence and accommodation distances. In this case, virtual objects that must be seen in focus, e.g., safety-relevant numbers or writing, can be displayed, e.g., in a 2D mode of operation in a suitable region of the planar pixel arrangement and hence of the windshield such that the convergence and accommodation distances correspond. On the other hand, virtual objects for which such a mismatch is little bothersome, e.g., large-area markings of lanes, can continue to be represented in the 3D mode of operation.

By contrast, younger drivers, who normally do not have permanent hyperopia and for whom the aforementioned mismatch therefore plays a smaller role, can also be provided with a superimposition of virtual 3D displays with fine structures, such as writing, at a perceived 3D distance that is greater than the distance of the planar pixel arrangement from their eyes (such as, e.g., approximately 1.2 m for typical vehicle geometries), i.e., for which the convergence and accommodation distances do not correspond.

Here, any number of further suitably graded mode of operation and hence representation packages can be (but need not be) implemented between the two extremes of "younger driver" and "elderly driver" and these may likewise be selectable automatically and/or by the user or driver themselves. In particular, an individual adjustability of a size of virtual fonts and/or symbols by the user can additionally be implemented in such representation packages.

In particular, the provision of at least one user parameter comprises the capture of a viewing direction and the convergence angle of the user in relation to an object, represented in 3D, of the virtual display image. In this case, a region of the planar pixel arrangement corresponding to this object is switched from a 3D mode of operation to a 2D and/or monocular mode of operation should the captured convergence angle deviate in predefined fashion from a convergence angle corresponding to the 3D representation. In particular, there can be a switch back into the 3D mode of operation in this case as soon as the user's gaze departs from this object again. By way of example, the convergence angle can be implemented by the capture of the viewing direction of both eyes of the user by tracking or other suitable means.

As a result of this configuration of the method, it is possible, for example, to additionally assist and/or monitor the setting of the eyes of the user in relation to a suitable convergence angle (as is presented elsewhere herein) in the 3D mode of operation. By way of example, should the captured convergence angle wrongly become too close for any reason (e.g., corresponding to the distance of the planar pixel arrangement, such as approximately 1.2 m in the case of typical vehicle geometries) even though the virtual 3D object is intended to be seen at a greater distance, then the planar pixel arrangement can be switched, e.g. in automated fashion, to a monocular representation of this object so that it is likewise seen in focus and comfortably by the user. The monocular representation can be maintained, in particular, right until the user averts their gaze from this superimposed object and so there is a switch back to the 3D representation as soon as possible. As a result, when the user observes the same object the next time, the user can again be provided with the option of seeing in 3D, as provided, by virtue of a convergence angle reselected by their brain-eye system matching the superimposed 3D object. As a rule, the aforementioned incorrect excessively close focusing will only be possible in the few cases where the user changes their view in a targeted fashion directly from a display of an instrument cluster in the interior of the motor vehicle to a virtual display in order to read the latter before their gaze returns to the road.

In cases of the method where a region of the planar pixel arrangement is switched from a 3D mode of operation to a monocular mode of operation, it is possible, in particular, to increase a brightness per pixel for this region, for example approximately double the brightness, in order to at least partly compensate a loss of intensity as a result of losing the light component destined for the second eye. As an alternative or in addition thereto, when a region of planar pixel arrangement is activated in a monocular mode of operation, provision can be made for this region to be subdivided into portions for which certain monocular modes of operation are respectively activated for different eyes of the user. Expressed differently, certain image content is only introduced for the left eye and other image content is only introduced for the right eye of the user in this case. In particular, this can contribute to the user not noticing the transition to the monocular vision because they continue to use both eyes for the relevant object. As an alternative or in addition thereto, a mixed operation with a 3D mode of operation for the relevant region of the planar pixel arrangement can in particular also be activated in the aforementioned cases of a monocular mode of operation, in which large-area virtual objects (e.g., lane markings), in particular, continue to be represented in 3D and smaller and/or finer virtual objects (e.g., an arrow in front of a tunnel wall) are represented in monocular fashion. This can contribute to further increased comfort of the user since large-area objects are comparatively uncritical in view of a fitting convergence angle and the user the sees them with both eyes.

In a specific configuration of the method of the type presented herein, the provision of at least one surroundings and/or user parameter comprises the capture of an acceleration and/or a position or movement disruption of the user and/or an acceleration and/or a position or movement disruption of a moving overarching system, in particular of the motor vehicle in which the visual field display apparatus is assembled, and/or of current surroundings behind the projection screen, in particular surroundings in front of the motor vehicle. A virtual display image generated by the visual field display apparatus is stabilized on the basis of the captured acceleration and/or position or movement disruption of the user and/or the moving overarching system and/or the current captured surroundings such that the virtual display image is generated with a stable position in relation to the surroundings behind the projection screen from the view of the user, even in the case of fast head and/or system movements. Position or movement disruptions can comprise, in particular, deviations of representation-relevant position or movement parameters of the user and/or of the overarching system from the normal operation of the visual field display apparatus, for example if an implemented eye tracking unit loses the eye position of the user.

This configuration of the method can be applied, for example, to a contact-analog 3D, 2D or monocular representation of a virtual display image so that disruptions as a result of fast movements of the user relative to the surroundings behind the projection screen do not have an effect on the contact-analog superimposition. Purely by way of example, the motor vehicle and its occupant, who uses the visual field display apparatus, form an overall system in the case of a motor vehicle (as analogously for any other overarching system), said overall system being subject to the following disruptions:

from outside: poor road surfaces lead to vehicle vibrations and additionally vibrations of the head position relative thereto;

from the inside: inherent head movements of the user can also represent disruptions.

By way of example, this configuration of the method can be implemented by means of a PID controller. In particular, an algorithm can be implemented in a control unit in this case, said algorithm ascertaining a transfer characteristic of the overall system of individual motor vehicle and occupants and optimizing the D-characteristic (i.e., the derivative component that reacts to changes in the disruption signal) in particular to this end, in such a way that an expected change of the eye position is predicted in the case of displacements of the motor vehicle and the display image is stabilized on the basis thereof. In particular, such a transfer characteristic of the individual overall system can be ascertained in advance, e.g., before or at the start of a journey.

Displacements, i.e., accelerations of the motor vehicle, can be captured to this end by way of, for example, a suitable acceleration sensor of a known type, the acceleration sensor being rigidly connected to the motor vehicle. In particular, navigation data available on board of the motor vehicle and a vehicle orientation ascertained in a manner known per se can be interpreted in the process and, from this, it is possible to extrapolate how the displayed image superimposition can be corrected in order to continue to appear in contact-analog fashion in the case of the resultant eye position to be expected. Here, the eye position to be expected can take account of, for example, typical head displacements in the case of driving maneuvers such as driving around corners, acceleration, braking, etc., and also typical head movements in the case of road unevennesses. The conversion into suitable correction signals, in particular the predicted eye position, can be trained, for example for typical vehicle movements, by means of artificial intelligence, i.e., by means of a suitable self-learning algorithm.

In a development of the aforementioned configuration of the method, the planar pixel arrangement is deactivated if a predetermined disruption threshold is exceeded by the captured acceleration and/or position or movement disruption of the user and/or of the overarching system, said deactivation lasting the duration of such a disruption. This development allows a suitable disruption threshold to be stored, e.g., in the control unit, for very substantial disruptions, in particular, to which the presented image stabilization cannot react quickly enough (e.g., when driving through a large pothole or a cobbled street). In the process, the planar pixel arrangement or the entire visual field display apparatus is briefly deactivated, in particular for the duration of the predetermined disruption threshold being exceeded or until image stabilization has taken place, in order to avoid irritations of the user by way of a virtual display image not being represented in correct contact-analog fashion.

In particular, in the method of the type presented herein, an object of the virtual display image, to be displayed in 3D, can be equipped with prominent vertical structures with a spacing from one another dependent on a predetermined convergence angle for the purposes of assisting the setting of a suitable predetermined convergence angle of the eyes of the user (see further above). As a result, the brain-eye system of the user can be assisted with setting a suitable predetermined convergence angle, which, for example, can be ascertained by the control unit on the basis of the captured surroundings in the background, e.g., its spatial depth or distance, by way of an implemented algorithm. What is behind this is the fact that the brain, as a rule, is trained to interpret closely spaced apart vertical lines in individual images reaching the left eye and the right eye as a single real object and hence to set the convergence angle of the eyes in such a way that the two vertical lines coincide in a single line in the 3D image constructed by the brain.

According to one embodiment, the visual field display apparatus comprises a reflection-suppressing deflection arrangement arranged on the planar pixel arrangement (which, in particular, can be embodied as one or more flat screens), the deflection arrangement comprising one or more plane reflection surface(s), which extend along the planar pixel arrangement at a predefined acute angle thereto and parallel to one another, for the purposes of projecting the generated projection light beam on the projection screen. Here, the one or more reflection surface(s) have a light-absorbing embodiment on their back side(s) for the purposes of suppressing interfering reflections.

In contrast to the conventional HUD structure with a projection optical unit housed in the interior of the instrument panel of a motor vehicle, as set forth at the outset, a visual field display apparatus according to this embodiment has a significantly flatter structure and can be installed with an installation depth of only a few cm in an upper side of the instrument panel or can subsequently be assembled thereon, for example. This facilitates a significant expansion in the field of view of the visual field display apparatus, for example also significantly beyond the horizon in the vertical direction, which is particularly suitable for contact-analog representations for the driver and other occupants for the purposes of assisting navigation or within the scope of autonomous driving. In particular, this allows a true contact-analog 3D effect (stereo augmented reality), wherein the contact-analog representation can be both binocular and monocular.

The plurality of mutually parallel reflection surfaces of the reflection-suppressing deflection arrangement can each have the same embodiment or else can differ from one another in terms of form or size. Depending on the form or size thereof, the spacing thereof in a direction perpendicular to the direction of extent thereof can be chosen such that virtually complete interfering reflection suppression and a substantially loss-free and form-maintaining deflection of the projection light beam are ensured. A few examples to this end are specified below. In principle, any sun light-absorbing coating known per se, for example a matte black layer, is suitable for the back sides of the reflection surfaces.

According to a development of this embodiment, at least one of the reflection surfaces of the reflection-suppressing deflection arrangement is formed by a lateral side of a prism arranged on the planar pixel arrangement. (The prism can have a triangular, quadrilateral, in particular trapezoidal, or pentagonal cross-sectional area, for example.) This can impart great mechanical stability, in particular, to the respective reflection surface. The prism can be manufactured from any material transparent to the projection light employed, in particular from a glass or plastic. In the case of an air layer between the reflection surface and the light-absorbing back side thereof, the reflection can arise as a result of total internal reflection at the specified lateral side of the prism; otherwise, a reflecting layer, for example made of metal, and, on the latter, a light-absorbing layer can be applied on the prism.

For respectively two adjacent reflection surfaces, a light emergence plane, which connects an upper edge of the one reflection surface to the lower edge of the back side of the next reflection surface, is aligned substantially perpendicular to the projection screen during the operation of the visual field display apparatus in a specific configuration. In particular, this can lead to a complete interfering reflection suppression for ambient light from all directions.

In a specific configuration, upper edges of the plurality of mutually parallel reflection surfaces of the reflection-suppressing deflection arrangement lie substantially along one line from the view of the user, for example in order to conceal the reflection surfaces from a direct view of the user. In particular, this can be adjustable by means of a suitable lift/tilt device for the reflection-suppression deflection arrangement or the planar pixel arrangement, either manually or at least partly automatically, for example by way of the eye tracking. To this end, the method can comprise, in particular, the following additional steps:

providing a current position, in particular an eye position or a direction of view, of the user and carrying out the aforementioned alignment of upper edges of the plurality of mutually parallel reflection surfaces of the reflection-suppressing deflection arrangement on the basis of the current user position provided.

According to a further aspect, provision is made of a control unit for a visual field display apparatus, wherein the control unit is embodied for an at least partly automated implementation of a method of the type presented herein. According to a further aspect, provision is made of a computer program which, when executed in a control unit, is configured to carry out a method of the type presented herein.

According to further aspect, provision is made of a motor vehicle comprising an upper side of an instrument panel extending between a windshield of the motor vehicle and the instrument panel;

a visual field display apparatus which is arranged on, in or under the upper side of the instrument panel, which comprises an autostereoscopic planar pixel arrangement for generating a projection light beam with display content, and which is embodied to project this display content on the windshield of the motor vehicle in such a way that a virtual display image which is superimposed into a visual field of the driver and/or further occupants arises behind the windshield; and a control unit of the type presented herein.

In particular, the visual field display apparatus can be embodied according to the embodiment above and either the autostereoscopic planar pixel arrangement thereof or the reflection-suppressing deflection arrangement arranged thereon can be arranged substantially flush with the upper side of the instrument panel of the motor vehicle.

The aforementioned aspects of the invention and the embodiments and specific configurations thereof are explained in more detail below on the basis of the examples illustrated in the attached drawings. The drawings are purely schematic; in particular, they should not be read as true to scale. Similar or corresponding elements are provided with the same reference sign therein.

DETAILED DESCRIPTION OF THE DRAWINGS

All specific details and variants of the operating method for a visual field display apparatus according to the first aspect of the invention, in particular various configuration features of the relevant visual field display apparatus according to the above embodiment, specified above and below in the description and the claims can be implemented in the examples shown in FIGS. 1 to 10c. Conversely, the specific examples shown in FIGS. 1 to 10c should only be understood to be a simplified, exemplary illustration of the features defined more generally in the description and the claims.

Figure 1:
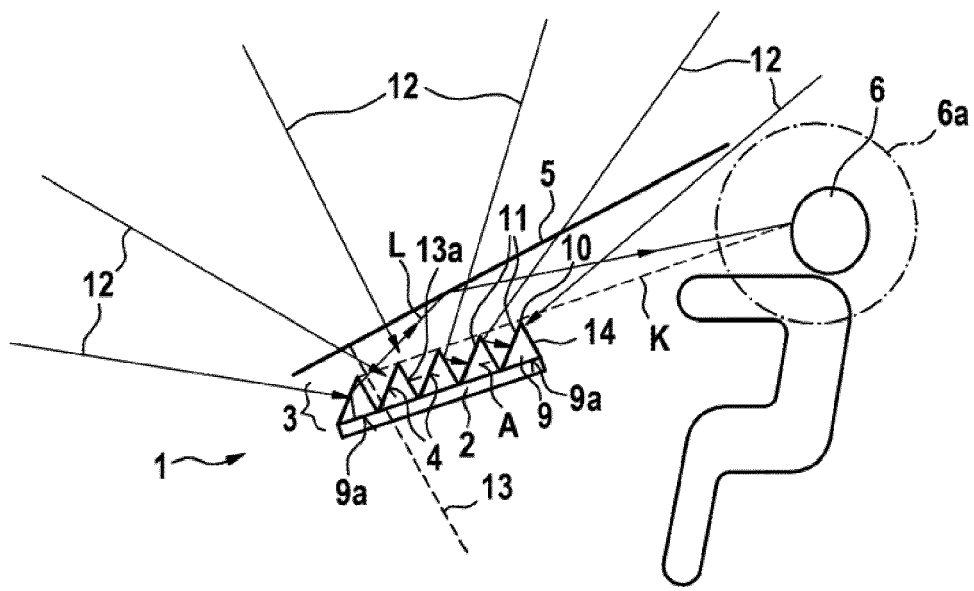
FIG. 1 shows a schematic lateral cross-sectional view of a visual field display apparatus according to the above embodiment of the invention.

FIG. 1 shows, in a much simplified schematic vertical cross-sectional view, a visual field display apparatus 1 according to the above embodiment of the invention in a motor vehicle (not illustrated in FIG. 1; cf. FIGS. 2a-2d and 5a-5b), in particular a head-up display.

The visual field display apparatus 1 comprises an electrically drivable autostereoscopic planar pixel arrangement 2, which generates a projection light beam L with desired display content during operation. Further, the visual field display apparatus 1 comprises a reflection-suppression deflection arrangement 3, which is arranged on the planar pixel arrangement 2 and which, in this example, comprises a plurality of plane reflection surfaces 4 (five purely by way of example) which extend along the planar pixel arrangement 2 at a predefined acute angle thereto and parallel to one another. As a result of deflecting the projection light beam L at the reflection surfaces 4, it is projected onto a windshield 5 of the motor vehicle and reflected by the latter to the eyes of a user 6 (indicated by arrows), in particular of the driver or front seat passenger. As a result, a virtual display image superimposed in a visual field of the user 6 arises behind the windshield 5 (cf. FIGS. 5b, 7 and 8) and is superimposed on real surroundings in front of the motor vehicle observed through the windshield 5 for the user 6. The predefined acute angle of incidence of the reflection surfaces 4 can be set to this end in an application-specific manner, for example from the opposing geometric arrangement of the planar pixel arrangement 2, the windshield 5, and the user 6. Here, on the back sides 11 thereof, the reflection surfaces 4 have a complete light-absorbing embodiment for the purposes of suppressing interfering reflections.

By way of example, the visual field display apparatus 1 can be assembled in or on an upper side 7 of an instrument panel 8 (not illustrated in FIG. 1; cf. FIGS. 2a-2d and 5a) of the motor vehicle between the windshield 5 and the instrument panel 8, or in or on the steering wheel. Here, at least in sections, the planar pixel arrangement 2 or the reflection-suppressing deflection arrangement 3 can be arranged, for example, substantially flush with the upper side 7 of the instrument panel 8, which may be particularly inconspicuous, offer protection to the optical components or the user 6, and/or save space.

In FIG. 1, all reflection surfaces 4 for the reflection-suppressing deflection arrangement 3 are formed, purely by way of example, by lateral faces of prisms 9 made of glass or plastic that are resting on the planar pixel arrangement 2. This can yield a particularly robust structure of the visual field display apparatus 1 and can protect both the planar pixel arrangement 2 and the reflection surfaces 4 from damage and protect the user 6 from injury on exposed edges. In particular, the exposed, upper prism edges 10 can additionally be rounded or chamfered and, in particular, likewise have a light-absorbing embodiment to this end, for example in similar fashion to and for the same purpose as the back sides of the reflection surfaces.

In particular, the respective prism 9 in FIG. 1 has a triangular cross-sectional area A such that its other, lower lateral side 9*a* rests on the planar pixel arrangement 2 while its third lateral side serves as a light emergence surface 13*a* for the deflected projection light beam L. The light emergence surfaces 13*a* can be provided with a suitable antireflection coating, in particular from the outside. In FIG. 1, the lateral sides 9*a* of the prisms 9 resting on the planar pixel arrangement 2 directly adjoin one another in purely exemplary fashion.

In the geometric arrangement of the reflection surfaces 4 shown in FIG. 1, it is possible, in particular, to achieve a virtually complete suppression of interfering reflections of the ambient light 12 from any direction from outside and within the vehicle by way of the light-absorbing back sides 11 of the reflection surfaces, as indicated symbolically in FIG. 1 by an interference reflection-free region 6*a* around the user 6. To this end, for example, light emergence planes 13, which for respectively two adjacent reflection surfaces 4 connect an upper edge of the one reflection surface to the lower edge of the back side 11 of the next reflection surface and in which the light emergence surfaces 13*a* of the prisms 9 are located in this example, are aligned substantially perpendicular to the windshield 5. In particular, the reflection surfaces 4 and their light-absorbing back sides 11 are located directly on the planar pixel arrangement 2 with their lower edges in this example, the planar pixel arrangement 2 possibly also comprising a protective cover layer, etc., where necessary.

Furthermore, in FIG. 1, a front reflection surface 4 located closest to the user 6 is concealed by a darkened or light-absorbing cover surface 14 in the direction of view of the user 6 in order to prevent the user from being blinded thereby. In this example, the cover surface 14 covers a lateral side of the front prism 9 facing the user 6. In particular, the same coating as used for the light-absorbing back sides 11 of the reflection surfaces 4, for example a black matte coating, is suitable for the cover surface 14. As an alternative, a separate cover surface arranged in front of the front reflection surface 4 in the direction of the user can be provided for the same purpose, and so the specified reflection surface 4 is also usable for the purposes of deflecting the projection light.

Moreover, in FIG. 1, upper edges of the reflection surfaces 4 are located, purely by way of example, substantially along a line K from the view of the user 6 of the visual field display apparatus 1.

Figure 2A:
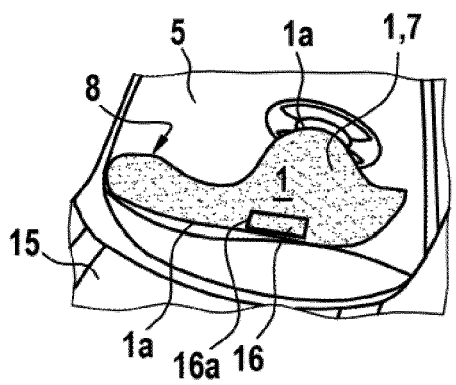
FIG. 2a shows a perspective view of a possible extent of a visual field display apparatus according to the above embodiment in an upper side of an instrument panel of a motor vehicle.

FIG. 2*a* schematically shows a perspective view of a possible extent of a visual field display apparatus 1 according to the above embodiment of the invention, in particular according to FIG. 1, in an upper side 7 of an instrument panel 8 of a motor vehicle 15. An overall height of the visual field display apparatus 1 in a direction perpendicular to the planar pixel arrangement 2 can be, in particular, only a few cm, for example between 0.5 and 10 cm, in particular between 1 and 7 cm, e.g., approximately 2, 3, 4, 5 or 6 cm. On account of a corresponding small installation depth of the visual field display apparatus 1, it can, in principle, assume an entire area of the upper side 7 of the instrument panel 8 of the motor vehicle 15 in front of the windshield 5, as indicated by its possible contour 1*a* in FIG. 2*a*. For comparison purposes, FIG. 2*a* indicates a light emergence opening 16 and its edge 16*a* in the case of a conventional projection unit of an HUD, as set forth at the outset, with a projection optical unit (not shown) housed below the upper side 7 of the instrument panel 8.

Figure 2B:
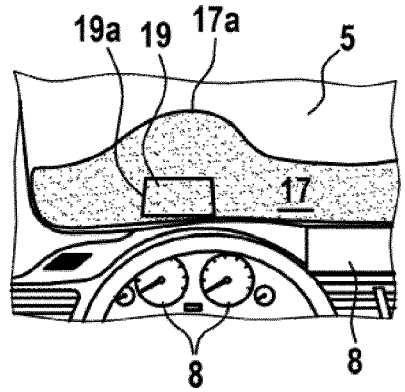
FIGS. 2b and 2d each show a perspective view of a projection region, usable by the visual field display apparatus of FIG. 2a, in the windshield of the motor vehicle from the view of the driver.

FIGS. 2*b* and 2*b* each schematically show, from the view of the driver, a perspective view of a projection region 17 of the windshield 5 of the motor vehicle 15 that is usable by the visual field display apparatus 1 of FIG. 2*a*, the boundary 17*a* of the projection region corresponding to the contour 1*a* of the visual field display apparatus 1. Once again, a projection region 19 corresponding to the light emergence opening 16 of a conventional projection unit and its boundary 19*a* are indicated for comparison purposes. In contrast to the latter, the projection region 17 usable by the visual field display apparatus 1 can identifiably reach significantly above the horizon in the upward direction and can also laterally cover a majority of the road region in front of the windshield 5 to be observed by the driver.

Figure 2C:
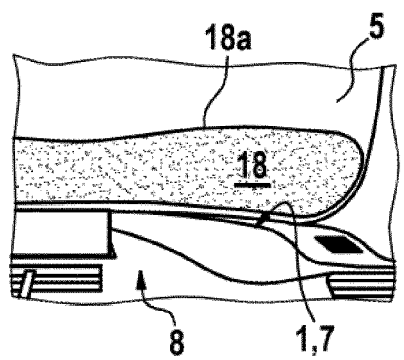
FIG. 2c shows a perspective view of a projection region, usable by the visual field display apparatus of FIG. 2a, in the windshield of the motor vehicle from the front passenger view.
Figure 2D:
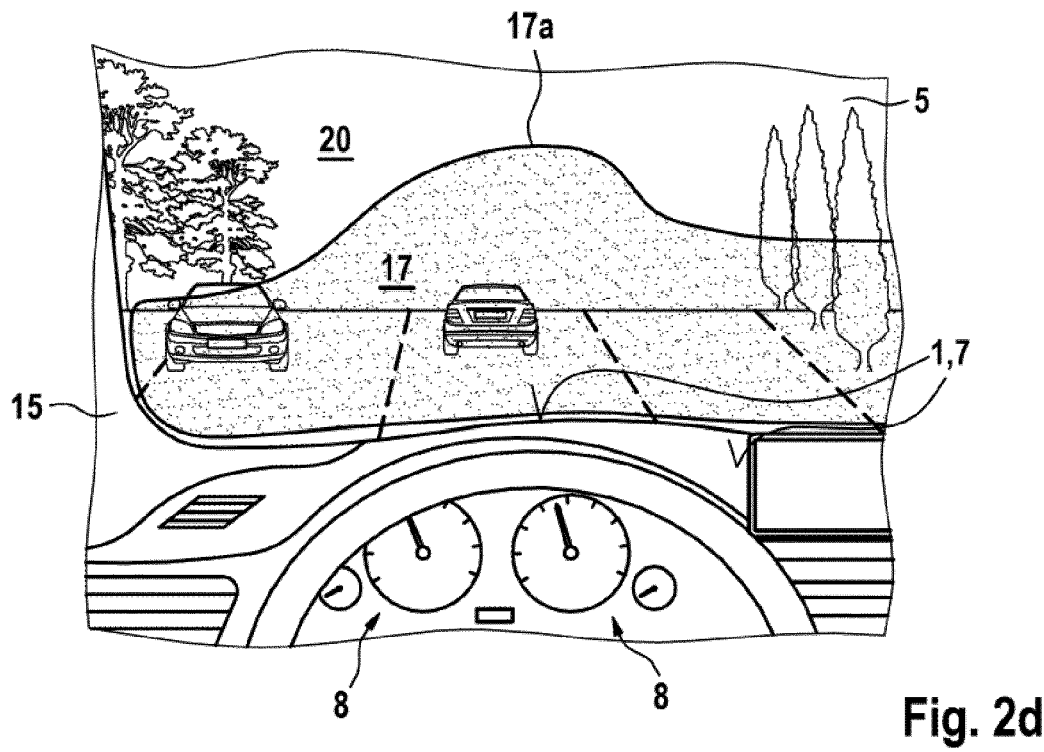

FIG. 2*c* schematically shows, from the view of a front seat passenger, a perspective view of a projection region 18 of the windshield 5 of the motor vehicle 15 that is usable by the visual field display apparatus 1 of FIG. 2*a*, the boundary 18*a* of the projection region corresponding to the contour 1*a* of the visual field display apparatus 1. As can easily be identified herefrom, the effects of the visual field display apparatus 1 specified above for the driver are equally usable by the front seat passenger. A similar statement applies accordingly to further occupants of the motor vehicle 15, for example from a rear compartment lounge position. Overall, multi-user use of the visual field display apparatus 1 is therefore possible. If the content should be only seen by one user in each case, the pixel matrix of the planar pixel arrangement 2 should be driven by way of the evaluation of an eye tracking for all considered users, in such a way that the image can only be seen by the relevant user.

Figure 3A:
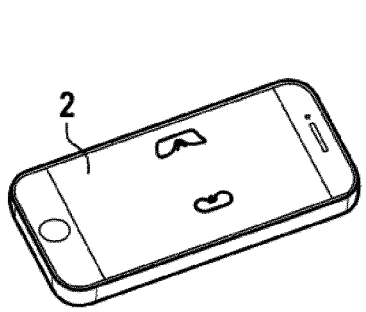
FIGS. 3a to 3c show perspective views of a model example of a visual field display apparatus according to the above embodiment, for the purposes of explaining the deflection effect of its reflection-suppressing deflection arrangement with a plurality of prisms.
Figure 3B:
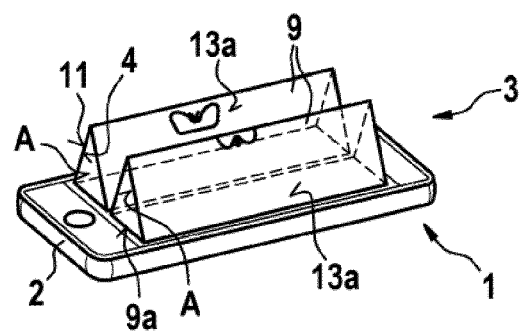
Figure 3C:
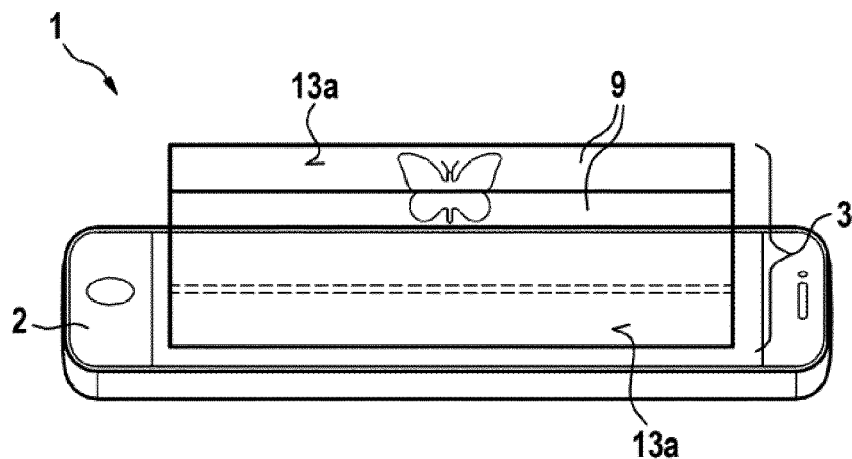

FIGS. 3*a* to 3*c* show, respectively in a perspective view, a much simplified model example of a visual field display apparatus 1 according to the above embodiment (for example, according to FIG. 1) for the purposes of explaining the deflection effect of its reflection-suppressing deflection arrangement 3, the reflection surfaces 4 of which are formed in this model by back lateral sides, distant from the observer or user, of two prisms 9 with triangular cross-sectional areas A.

In this model example, the planar pixel arrangement 2 is embodied as a flat screen which generates desired display content, the two-dimensional image of a butterfly shown in FIG. 3*a* within the scope of this example, said image being transported by the projection light beam L emanating from the flat screen (cf. FIG. 1). When passing the reflection-suppressing deflection arrangement 3 arranged on the planar pixel arrangement 2, the projection light beam L is deflected at the reflection surfaces 4 of the back lateral sides of the prisms 9 in order, for example like in FIG. 1, to reach the windshield 5 of the motor vehicle and, after a reflection by the latter, the eyes of the user 6.

As can be seen in FIG. 3*b*, the projection light beam L input coupled by the lower lateral sides 9*a* of the prisms 9 emerges from the light emergence surfaces 13*a* thereof, while the back sides 11 of the reflection surfaces 4 have a light-absorbing embodiment for the ambient light in order to suppress interfering reflections. As shown in FIG. 3*c*, the projection light beam L coupled into the reflection-suppressing deflection arrangement 3 leaves the light emergence surfaces 13*a* of the prisms 9 substantially without loss of brightness and, in the case of a suitable actuation of the planar pixel arrangement 2 as in FIG. 3a, without loss of shape either.

Figure 4A:
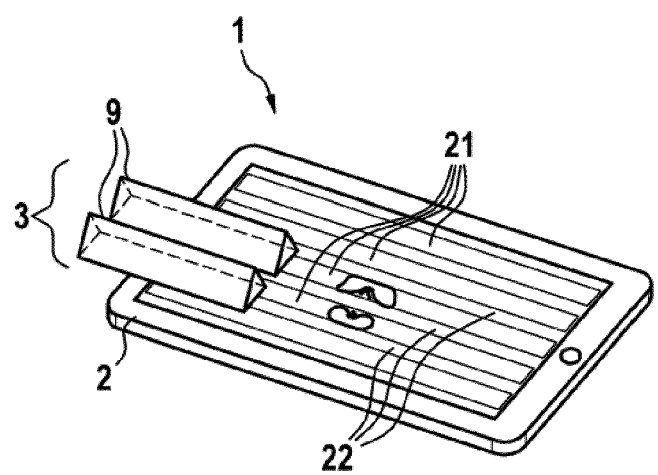
FIGS. 4a and 4b show perspective views of a further model example of a visual field display apparatus according to the above embodiment, for the purposes of explaining how visible and invisible stripes arise in an area containing the planar pixel arrangement.
Figure 4B:
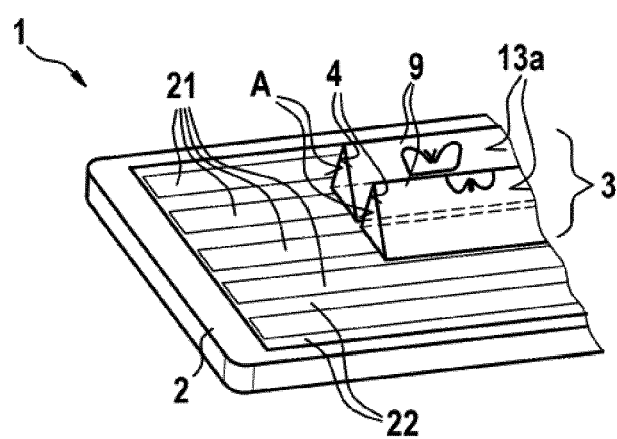

FIGS. 4a and 4b each show, in a perspective view, a further greatly simplified model example of a visual field display apparatus 1 according to the above embodiment (for example, according to FIG. 1), for the purposes of explaining the creation of visible and invisible stripes in an area containing the planar pixel arrangement 2. Like in FIGS. 3a-3c, the planar pixel arrangement 2 is also embodied as a flat screen in this case, which generates desired display content, the two-dimensional image of a butterfly shown in FIG. 4a in this example. In this model example, the reflection-suppressing deflection arrangement 3 arranged on the planar pixel arrangement 2 is also formed by prisms 9 resting on the flat screen, the long sides of the prisms adjoining one another, in a manner analogous to FIGS. 3b-3c; for reasons of simplicity, only two of possibly more than two prisms have been shown in this case as well.

As additionally indicated in FIGS. 4a and 4b, stripes 21 extend parallel to the reflection surfaces 4 of the prisms 9 in the pixel area, it being possible to make these parallel stripes visible to the user of the visual field display apparatus 1 by way of the deflection of the projection light at the reflection surfaces 4 of, in this case, up to five identical prisms 9. Stripes 22 that are invisible to the user of the visual field display apparatus 1 are located therebetween.

Therefore, the invisible stripes 22 in the pixel arrangement can be left black or else used for other functions, for example as an air outlet for a windshield heater or internal ventilation, as an opening for a sound source, as a light source for diffuse internal lighting or as an overlap region when nesting or staggering adjacent portions of a composed planar pixel arrangement.

In particular, to this end, a first reflection surface 4 furthest away from the user 6 can also be placed directly without a prism under a window base of the windshield 5 of the motor vehicle, for example in FIG. 1, and can be protected both mechanically and against possible user injury, unlike in the case of freestanding reflection surfaces. As an alternative to the omission of a prism 9, prism edges opposite to the respective reflection surfaces 4 can be cut off in a region corresponding to the invisible stripes 22, which is not passed by the projection light beam L, in the case of this reflection surface and/or other reflection surfaces 4 (and not only in this example). As a result, the invisible stripes 22, for example, can be used differently as mentioned and/or the weight and the material consumption of the reflection-suppressing deflection arrangement can be reduced.

Figure 5A:
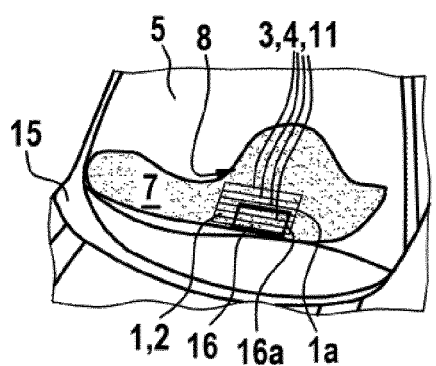
FIG. 5a shows a perspective view of a possible arrangement of a visual field display apparatus according to the above embodiment, in an upper side of an instrument panel of a motor vehicle.

FIG. 5a shows a perspective view of a possible arrangement of a visual field display apparatus 1 according to the above embodiment (for example, according to FIG. 1) in an upper side 7 of an instrument panel 8 of a motor vehicle 15. On account of its flat structure, the visual field display apparatus 1 can extend along the upper side 7 of the instrument panel 8, significantly beyond the edge 16a of a light emergence opening 16 of a projection unit of the conventional HUD structure as set forth at the outset, indicated in FIG. 5a for comparison purposes. As described further above for FIG. 2a, the visual field display apparatus 1 can take up as much as the entire area of the upper side 7 of the instrument panel 8.

In FIG. 5a, a planar pixel arrangement 2 of the visual field display apparatus 1 takes up a portion of the upper side 7 of the instrument panel 8 of the motor vehicle 15 in front of the windshield 5, which is delimited by a quadrilateral contour 1a in purely exemplary fashion. The planar pixel arrangement 2 can be embodied, in particular, as one or more 2D or 3D flat screens which are arranged next to one another in a plane or nested or stepped fashion. In the direction of the windshield 5, the planar pixel arrangement 2 is covered by a reflection-suppressing deflection arrangement 3, the plurality of mutually parallel reflection surfaces 4 or light-absorbing back sides 11 of which being indicated by parallel stripes.

Figure 5B:
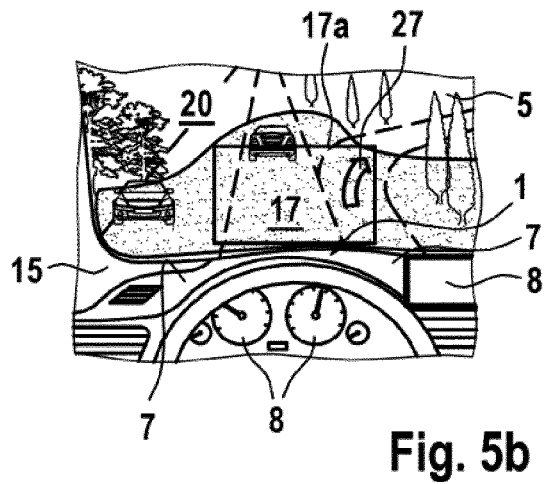
FIG. 5b shows a perspective view of a projection region, usable by the visual field display apparatus of FIG. 5a, in the windshield of the motor vehicle from the view of the driver with a virtual turning arrow superimposed in contact-analog fashion.
Figure 6:
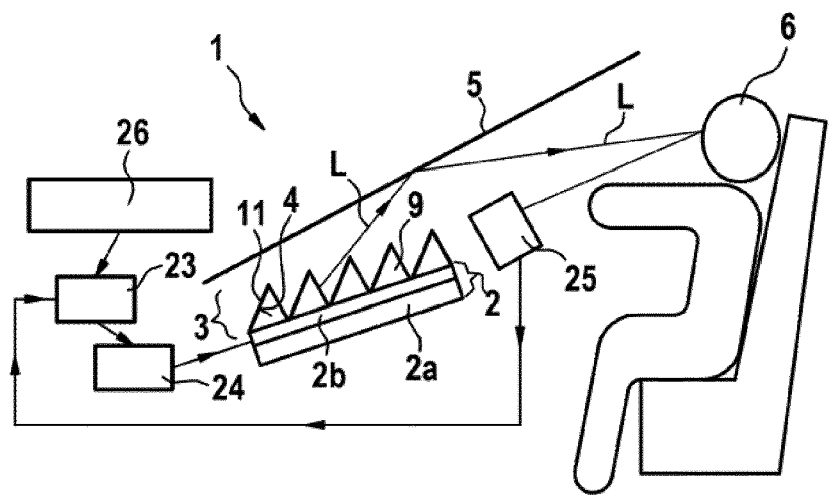
FIG. 6 shows a schematic lateral cross-sectional view of a visual field display apparatus according to the above embodiment, comprising driving components for its planar pixel arrangement for the purposes of carrying out the method of the type presented herein.

FIG. 5b shows the projection region 17 in the windshield 5 that is usable by the visual field display apparatus 1 of FIG. 5a, the boundary 17a of which corresponds to the contour 1a of the visual field display apparatus 1. In the upward direction, the projection region 17 extends identifiably clearly beyond the horizon and, in the lateral direction, it also covers a plurality of lanes of the road region in front of the motor vehicle 15 to be observed by the driver. On account of the correspondingly large solid angle or field of view of the visual field display apparatus 1, the latter is particularly suitable for contact-analog superimposition of virtual aid content into the visual field of the driver, depending on the real surroundings 20 in front of the motor vehicle 15. In particular, a true contact-analog 3D effect (stereo augmented reality) is possible with the visual field display apparatus 1:

FIG. 6 shows a schematic lateral cross-sectional view of a visual field display apparatus 1 according to FIG. 1 and FIG. 2a or 5a, the autostereoscopic planar pixel arrangement 2 of which comprises, for example, a luminous display 2a, e.g., a liquid crystal screen or any other standard display, which could also be used in a conventional HUD, for instance, and a microlens array 2b applied thereon or any other deflection means as per DE 10 2009 054 232 A1, which deflect the light rays of different luminous points of the display 2a in different emission directions.

To drive the planar pixel arrangement 2 for the purposes of generating a contact-analog 3D effect for the user 6, provision is further made, in a manner known per se, of a control unit 24 for the display 2a and the microlens array 2b. By way of example, from an image generation unit 23, the control unit 24 can receive display content to be displayed as a virtual display image. Here, the image generation unit 23 can be embodied, in particular, to calculate a suitable stereoscopic representation of surrounding objects to be displayed to the user 6 and, to this end, receive data about current surroundings 20 ahead of the motor vehicle 15, for example from a surroundings capture unit 26, and/or a current eye position of the user 6 from an eye tracking unit 25, which may comprise one or more cameras, for example. The respective signal lines are indicated by arrows in FIG. 6.

In cooperation with the image generation unit 23, the control unit 24 is embodied to carry out the method of the type presented herein in all of its configurations presented herein. That is to say, it is configured to switch the autostereoscopic planar pixel arrangement 2 between qualitatively different modes of operation, in particular for transitioning from a 3D display to a 2D or monocular representation of a virtual object, and vice versa. The surroundings and/or user parameters required to this end are provided in this example by the surroundings capture unit 26, the eye tracking unit 25 and further suitable sensors and systems, known per se, on board of the motor vehicle 15.

Figure 10A:
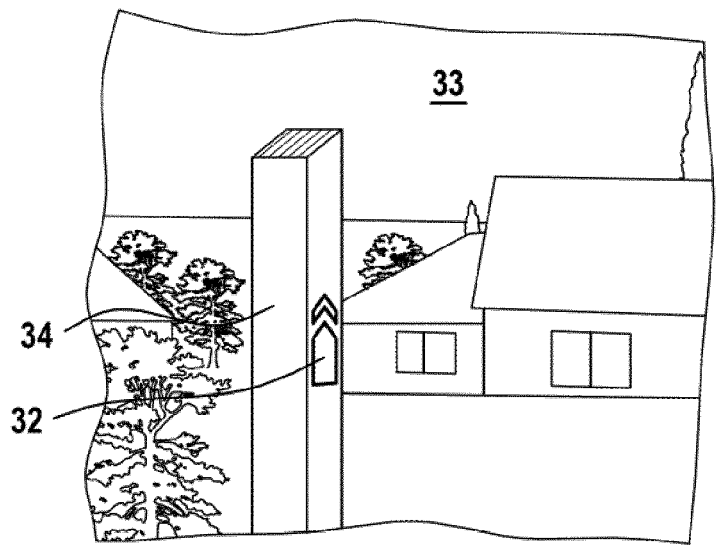
FIGS. 10a to 10c each show a view through a projection screen with a virtual marking arrow superimposed in contact-analog fashion in the 3D mode of operation of the planar pixel arrangement, which virtual marking arrow appears in focus and as a real 3D object to a user of the visual field display apparatus in the case of three very different distances of the background objects.
Figure 10B:
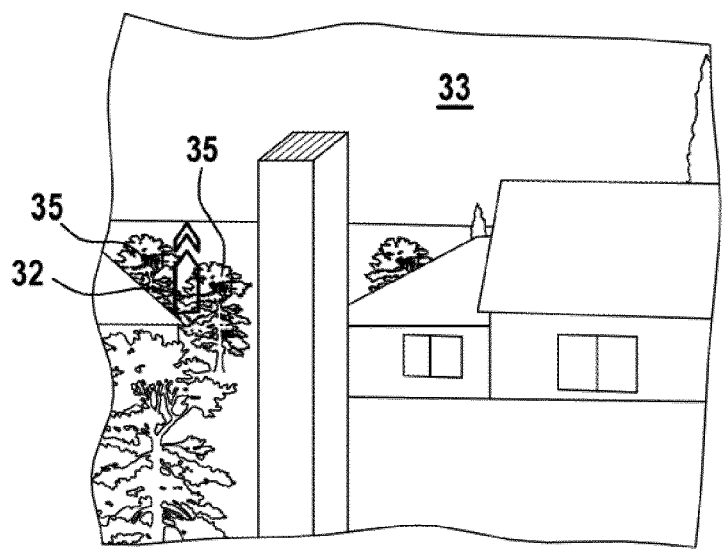
Figure 10C:
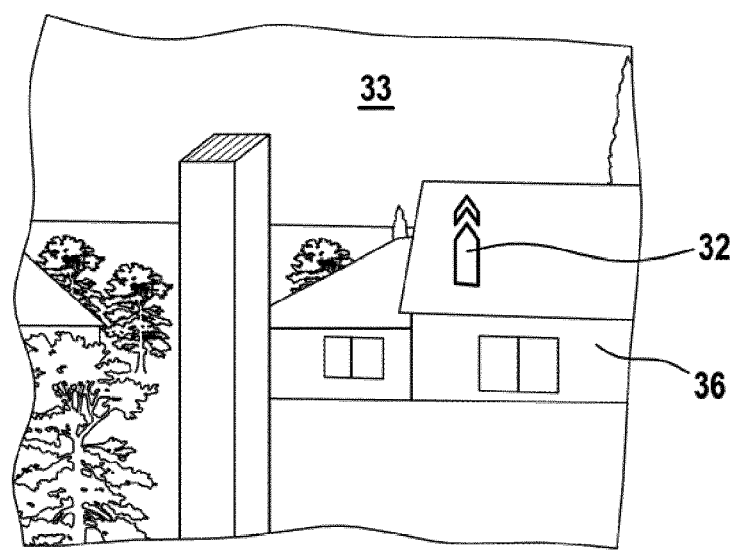

FIGS. 10a-10c show a typical example of how the eyes of a user automatically set a correct convergence angle (see above) for a 3D object, in this case a marking arrow 32, which has been superimposed in contact-analog fashion using an autostereoscopic planar pixel arrangement of a visual field display apparatus (not shown).

In the shown case, the 3D distance of the superimposed object is matched to the distance of the background. This assists the eyes with automatically setting the intended and correct convergence angle.

Here, FIGS. 10*a*-10*c* each show a view through a projection screen 33 tilted from the horizontal, wherein the virtual marking arrow 32 generated in a 3D mode of operation of the planar pixel arrangement in each case appears to the user with the same focus and as a real 3D object in the case of three very different distances of the background objects from the eyes of the user—a concrete pillar 34 at a distance of 2 m in FIG. 10*a*; a forest 35 at a distance of 1000 m in FIG. 10*b*; and a house 36 at a distance of 70 m in FIG. 10*c*. A single eye has a large depth of field: the superimposed object (marking arrow 32) and the distant background object (concrete pillar 34, forest 35 or house 36) are simultaneously seen in focus in all three of these cases, even though the convergence angle in all three cases does not correspond to the actual distance of the arrow from the eye to the pixel matrix (approximately 1.2 meters).

Figure 7:
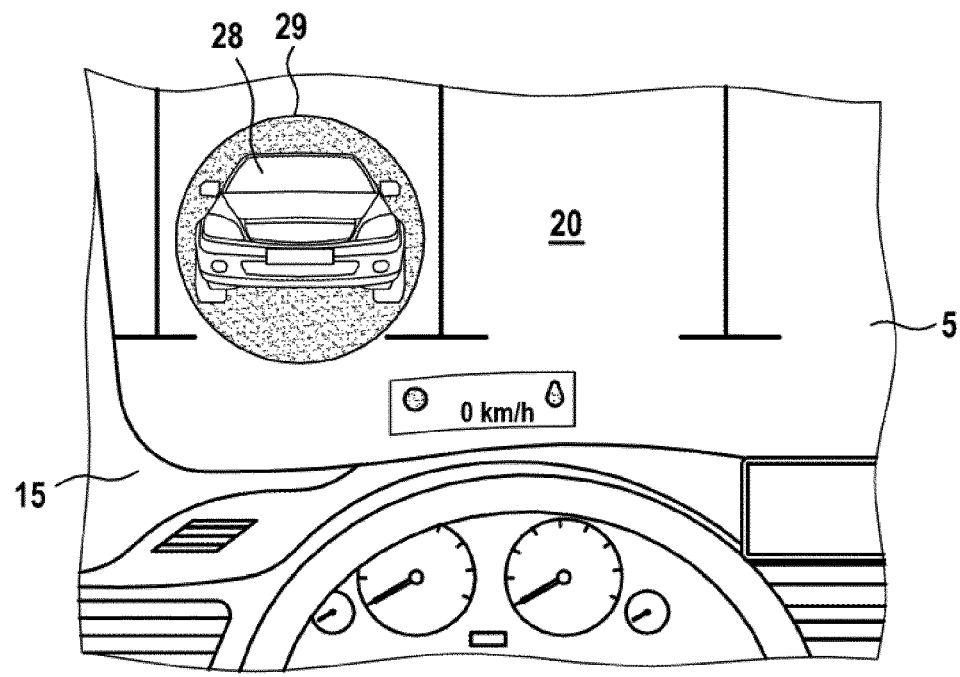
FIG. 7 shows a perspective windshield view from the view of the driver with a virtual marking of an external vehicle superimposed by the visual field display apparatus of FIG. 6 in contact-analog fashion.

Developments of the method of the type described herein for operating a visual field display apparatus 1 according to FIG. 6 are described with reference to FIGS. 5*b*, 7, and 8. (Here, the content 29, 30 and 31 superimposed in FIGS. 7 and 8 as virtual display images have no edge lines; instead, the indicated edge lines only serve to make things clearer to the reader.)

In one variant of the method, current surroundings 20 ahead of the motor vehicle 15 behind the windshield 5 are captured by the surroundings capture unit 26. Depending on the captured surroundings 20, information such as virtual object images and/or object markings for assisting the user 6 with navigation during independent or assisted travel or for visualizing/clarifying a driving situation captured by the motor vehicle 15 and its driving intent in the case of highly or fully automated driving (HAD/FAD) are superimposed in contact-analog fashion into the visual field of the user 6, in particular of the driver of the motor vehicle 15. Thus, a virtual turning arrow 27 is superimposed on the correct turning point in the street up ahead in contact-analog fashion in FIG. 5*b*, an external vehicle 28 in front of the owner's vehicle 15 detected in a parking lot in darkness is clearly visibly virtually marked using a colored circle, for example a red circle 29 in FIG. 7*a*, and a correct lane in front of the own vehicle 15 is visualized on a street without lane markings in FIG. 8 by a continuous colored, for example yellow, virtual lane marking 30 in the form of the entire lane to be driven.

Figure 8:
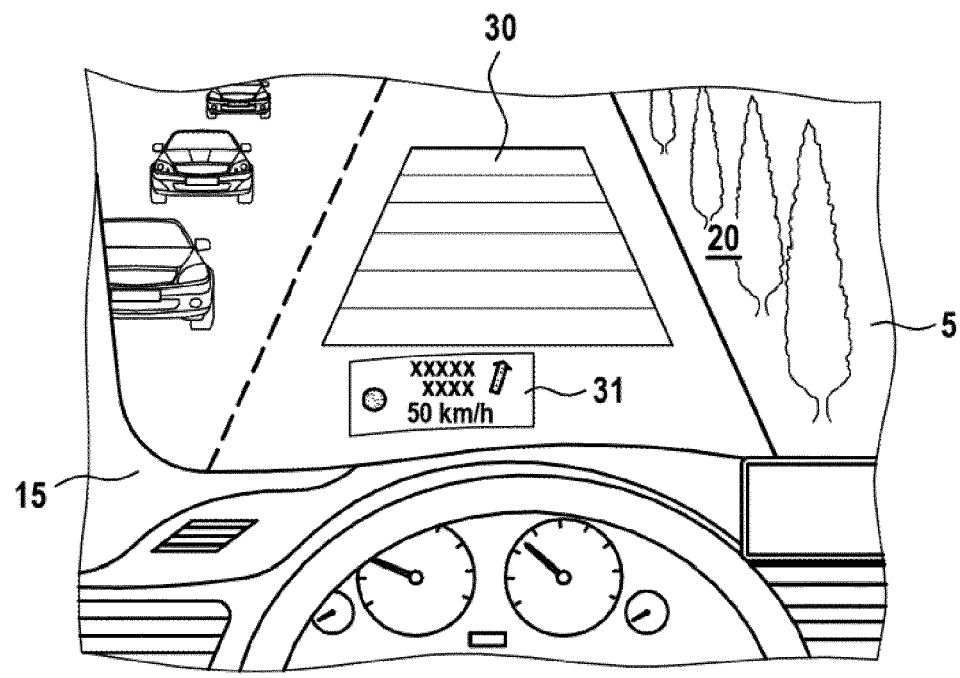
FIG. 8 shows a further perspective windshield view from the view of the driver with a virtual marking of a lane superimposed in contact-analog fashion by the visual field display apparatus of FIG. 6 and with further virtual display content statically superimposed by means of an additional conventional projection unit.

A further variant of the method, combinable with the above variant, is described on the basis of FIG. 8. In this case, the visual field display apparatus 1, in addition to the planar pixel arrangement 2 and the reflection-suppressing deflection arrangement 3, further comprises a conventional projection unit of the type set forth at the outset (not shown) for generating a further virtual display image 31 superimposed in a visual field of a user 6, in accordance with a so-called "hybrid approach".

In this hybrid approach, the planar pixel arrangement 2 with the reflection-suppressing deflection arrangement 3 arranged thereon can be arranged in the upper side 7 of the instrument panel 8 of the motor vehicle 15, for example as indicated in FIG. 5*a*, next to the light emergence opening 16 of the projection unit, in particular directly adjoining the latter or around the latter. In particular, however, the light emergence opening 16 of the projection unit—unlike the conventional position thereof as shown in FIG. 5*a*—can be arranged closer to the window base of the windshield 5 and adjacent to the lower contour side of the planar pixel arrangement 2 of FIG. 5*a* and can have more elongate embodiment in the horizontal direction than in FIG. 5*a* in order thus to be used to display the further virtual display image 31 lower below the horizon, for example immediately below the contact-analogous virtual display image generated by the planar pixel arrangement 2.

Here, this conventional projection unit, in the interior thereof, comprises both an imaging unit for generating a further projection light beam with the display content of the further virtual display image 31 and a projection optical unit arranged opposite the imaging unit for projecting the generated further projection light beam on a portion of the windshield 5. As a result, the conventional HUD technology can be combined with the aforementioned technology in order to be used in simultaneous or alternating fashion, depending on the situation. Here, the method can in particular include the following further steps:

providing system state data of the motor vehicle 15 and/or providing route data for a route portion ahead; and statically superimposing predefined information into the visual field of the user 6, in particular in a superimposition that is independent of the real object behind the windshield 5 in the representation, by way of the projection unit and/or the at least one autostereoscopic screen and/or the at least one 2D screen of the planar pixel arrangement 2 on the basis of the provided system state data and route data.

By way of example, the predefined static information could be alerts in the case of a critical charge state of an energy accumulator or a critical fill level of a fuel tank on board or in the case of upcoming adverse weather or it could be a display of a current speed limit or the exceeding thereof, etc.

Figure 9A:
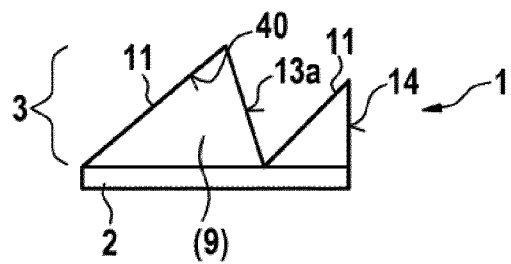
FIGS. 9a and 9b show schematic lateral cross-sectional views of further visual field display apparatuses according to the above embodiment.
Figure 9B:
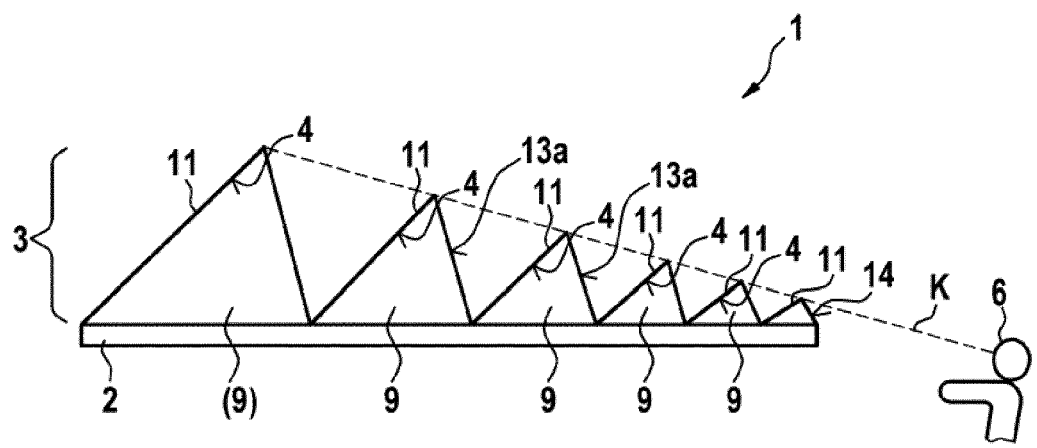

FIGS. 9*a*-9*b* each show in a schematic vertical cross-sectional view further specific configurations of the visual field display apparatus 1 according to the embodiment above. The reflection-suppressing deflection arrangement 3 of FIGS. 9*a*-9*b* differ from those in FIGS. 1 and 6 in that they have only a single large reflection surface 40 (FIG. 9*a*) or a plurality of reflection surfaces 4 with varying heights in relation to one another, perpendicular to the planar pixel arrangement 2 (FIG. 9*b*).

Using the visual field display apparatus 1 with a single large, e.g., approximately 6 cm high reflection surface 40 (in the direction perpendicular to the planar pixel arrangement 2) shown in FIG. 9*a*, it is already possible to obtain a field of view which is comparable in terms of the vertical direction to the conventional HUD in current motor vehicles mentioned at the outset. However, at the same time, the visual field display apparatus 1 of FIG. 9*a* can have a significantly wider embodiment than the conventional HUD in the horizontal direction on account of its flat structure, which may yield a correspondingly significantly larger field of view overall. Here, it is possible but not mandatory for the reflection surface 40 to be formed by a lateral side of a prism 9. Instead, the reflection surface 40 could also simply be a tilted mirror with a thickness that is required for the stability thereof and for keeping the user injury-free as this thickness has no influence on the virtual display image generated. This applies accordingly to the reflection surface 4 respectively arranged closest to the windshield 5 in FIGS. 1 and 6. Like in FIGS. 1 and 6, a dummy element with a light-absorbing cover surface 14 facing the user 6 and with a light-absorbing back side 11 parallel to the reflection surface 40 is arranged opposite the reflection surface 40 in FIG. 9a for the purposes of suppressing interfering reflections.

In FIG. 9b, the same as for the reflection surface 40 of FIG. 9a can apply to the first reflection surface 4 from the left, which is arranged closest to the windshield 5 in a motor vehicle, for example. As a result of further reflection surfaces 4, which are each successively reduced in height and, as shown in FIG. 9b, formed by correspondingly differently high prisms 9, an even larger field of view than in FIG. 9a is obtainable for the visual field display apparatus 1.

As a result of the successively reducing heights of the reflection surfaces 40, 4 or of the back sides 11 thereof in FIGS. 9a and 9b, the upper edges thereof can be aligned on a line K leading to the eyes of the user 6, for example even in the case of a section of the upper side 7 of the instrument panel 8 of the motor vehicle that has a more pronounced inclination with respect to the windshield 5 than in FIG. 1.

In the method of the type presented herein, in particular in the case of the visual field display apparatuses as shown in FIGS. 1 to 9b, a virtual display image can be generated at a fixed distance from the user 6 of slightly below or above one meter, approximately 1.2 m in the case of typical motor vehicle dimensions, using a planar pixel arrangement 2 which in addition to an autostereoscopic screen comprises a 2D screen. Without eye tracking having to be evaluated, information, for example in respect of the vehicle state, could be displayed permanently in this region, e.g., as a replacement for a conventional instrument cluster. However, as a matter of principle, any other type of information, in particular contact-analog superimpositions into the captured surroundings behind the projection screen could also be displayed thereby, which were mentioned herein in relation to a 3D representation.

LIST OF REFERENCE SIGNS

1 Visual field display apparatus
1a Contour of the visual field display apparatus in an upper side of an instrument panel
2 Autostereoscopic planar pixel arrangement
2a Display
2b Microlens array
3 Reflection-suppressing deflection arrangement
4, 40 Mutually parallel, inclined reflection surfaces of the reflection suppressing deflection arrangement
5 Windshield
6 User of the visual field display apparatus
7 Upper side of the instrument panel
8 Instrument panel of a motor vehicle
9 Prism
9a Lower lateral side of a prism
10 Upper prism edge
11 Back sides of the reflection surfaces of the reflection-suppressing deflection arrangement, with a light-absorbing embodiment
12 Ambient light
13 Light emergence plane(s) of the reflection-suppressing deflection arrangement
13a Light emergence surface of a prism
14 Cover surface
15 Motor vehicle
16 Light emergence opening of a conventional HUD projection unit
16a Edge of the light emergence opening
17 Projection region of the visual field display apparatus in the windshield from the view of the driver
17a Boundary of the projection region from the view of the driver
18 Projection region of the visual field display apparatus in the windshield from the view of the front seat passenger
18a Boundary of the projection region from the view of the front seat passenger
19 Projection region of a conventional HUD projection unit
19a Boundary of the projection region of the conventional HUD projection unit
20 Surroundings up ahead or located behind the projection screen
21 Visible stripes
22 Non-visible stripes
23 Image generation unit
24 Control unit
25 Eye tracking unit
26 Surroundings capture unit
27 Contact-analog superimposed turning arrow
28 Captured external vehicle in front of the owner's motor vehicle
29 Contact-analog superimposed marking of the captured external vehicle
30 Contact-analog superimposed lane marking
31 Statically superimposed further virtual display image of an additionally provided conventional HUD projection unit
32 Contact-analog superimposed marking arrow
33 Projection screen tilted from the vertical
34 Concrete pillar
35 Forest
36 House
L Projection light beam
A Cross-sectional area of a prism
K Line from the view of the user, lying on the upper edge of the plurality of reflection surfaces

What is claimed is:

1. A method for operating a visual field display apparatus for a motor vehicle comprising:
    an autostereoscopic planar pixel arrangement for generating a projection light beam with display content, and
    a reflection-suppressing deflection arrangement arranged on the planar pixel arrangement, wherein the reflection-suppressing deflection arrangement comprises one or more planar reflection surfaces, which extend along the planar pixel arrangement at a predefined acute angle to the planar pixel arrangement and parallel to one another, for purposes of deflecting the generated projection light beam with the display content and projecting the generated projection light beam with the display content on a partly transparent reflecting projection screen of the motor vehicle such that a virtual display image superimposed into a visual field of a user is generated behind the projection screen,
    the method comprising:
    providing at least one surroundings and/or user parameter; and
    switching between at least two qualitatively different 3D, 2D and/or monocular modes of operation of the planar pixel arrangement on the basis of the surroundings and/or user parameters provided, for purposes of adapting the virtual display image to qualitative changes in operation in relation to the surroundings and/or the user of the visual field display apparatus, wherein
    the provision of at least one user parameter comprises a capture and/or user-side input of the user's age and/or visual impairment, and the planar pixel arrangement is switched from a 3D mode of operation to a 2D and/or monocular mode of operation, at least in regions, if the captured and/or entered user parameters in respect of age and/or visual impairment do not meet predefined requirements for the 3D representation for a corresponding region of the virtual display image.

2. The method according to claim 1, wherein
the provision of at least one surroundings parameter comprises a capture of current surroundings behind the projection screen, including surroundings in front of the motor vehicle, and
the planar pixel arrangement is switched from a 3D mode of operation to a monocular mode of operation, at least in regions, if a spatial depth is not ascertainable in a predefined manner for a corresponding region of the captured surroundings in the background of the virtual display image.

3. The method according to claim 1, wherein
the provision of at least one user parameter comprises a capture of a viewing direction and convergence angle of the user in relation to an object, represented in 3D, of the virtual display image, and
a region of the planar pixel arrangement corresponding to said object is switched from a 3D mode of operation to a 2D and/or monocular mode of operation provided the captured convergence angle of the user deviates in a predefined manner from a convergence angle corresponding to the 3D representation, and there is a switch back into the 3D mode of operation as soon as the captured viewing direction departs from said object again.

4. The method according to claim 1, wherein
when a region of the planar pixel arrangement is switched from a 3D mode of operation to a monocular mode of operation, a brightness for said region is increased, and/or portions of said region are switched to monocular modes of operation provided for different eyes of the user,
wherein, a mixed operation of a 3D mode of operation with a monocular mode of operation is activated, in which large-area virtual objects are represented in 3D and smaller and/or finer virtual objects are represented in monocular fashion.

5. The method according to claim 1, wherein
the provision of at least one surroundings and/or user parameter comprises capture of at least one of: (i) an acceleration of the user and/or a moving overarching system in which the visual field display apparatus is assembled, (ii) a position or movement disruption of the user and/or of the overarching system, and (iii) current surroundings behind the projection screen, and
a virtual display image generated by the visual field display apparatus is stabilized on the basis of the captured acceleration, position or movement disruption, and/or the current captured surroundings such that the virtual display image is generated with a stable position in relation to the surroundings behind the projection screen from the view of the user, even in the case of fast head and system movements,
wherein the planar pixel arrangement is deactivated if a predefined disruption threshold is exceeded by the captured acceleration and/or position or movement disruption of the user and/or of the overarching system, said deactivation lasting for the duration of such a disruption.

6. The method according to claim 1, wherein
for purposes of assistance with setting of a suitable predefined convergence angle, an object, represented in 3D, of the virtual display image is generated with prominent vertical structures with a spacing from one another that depends on the predefined convergence angle.

7. The method according to claim 1, wherein
the one or more reflection surfaces have a light-absorbing element on their back sides for purposes of suppressing interfering reflections.

8. The method according to claim 7, wherein
at least one of the reflection surfaces of the reflection-suppressing deflection arrangement is formed by a lateral side of a prism arranged on the planar pixel arrangement, the prism having a triangular, quadrilateral, or pentagonal cross-sectional area.

9. The method according to claim 7, wherein
for respectively two adjacent reflection surfaces, a light emergence plane, which connects an upper edge of the one reflection surface to a lower edge of the back side of the next reflection surface, is aligned substantially perpendicular to the projection screen during the operation of the visual field display apparatus.

10. The method according to claim 7, wherein
upper edges of the plurality of mutually parallel reflection surfaces of the reflection-suppressing deflection arrangement lie substantially along one line from the view of the user, as a result of the following:
providing a current position of the user and aligning upper edges of the plurality of mutually parallel reflection surfaces to substantially form a line leading to eyes of the user on the basis of the current user position provided.

11. The method according to claim 10, wherein
the current position is an eye position or a direction of view of the user.

12. A control unit for a visual field display apparatus, comprising:
a processor and associated memory operatively configured to automatically:
provide at least one surroundings and/or user parameter; and
switch between at least two qualitatively different 3D, 2D and/or monocular modes of operation of a planar pixel arrangement on the basis of the surroundings and/or user parameters provided, for purposes of adapting a virtual display image to qualitative changes in operation in relation to the surroundings and/or the user of the visual field display apparatus, wherein the visual field display apparatus comprises:
an autostereoscopic planar pixel arrangement for generating a projection light beam with display content, and
a reflection-suppressing deflection arrangement arranged on the planar pixel arrangement, wherein the reflection-suppressing deflection arrangement comprises one or more planar reflection surfaces, which extend along the planar pixel arrangement at a predefined acute angle to the planar pixel arrangement and parallel to one another, for purposes of deflecting the generated projection light beam with the display content and projecting the generated projection light beam with the display content on a partly transparent reflecting projection screen of the motor vehicle such that a virtual display image superimposed into a visual field of a user is generated behind the projection screen, wherein the provision of at least one user parameter comprises a capture and/or user-side input of the user's age and/or visual impairment, and the planar pixel arrangement is switched from a 3D mode of operation to a 2D and/or monocular mode of operation, at least in regions, if the captured and/or entered user parameters in respect of age and/or visual impairment do not meet predefined requirements for the 3D representation for a corresponding region of the virtual display image.

13. A motor vehicle, comprising:

an upper side of an instrument panel extending between a windshield of the motor vehicle and the instrument panel;

the visual field display apparatus, arranged on, in or under the upper side of the instrument panel; and the control unit according to claim 12.

14. A method for operating a visual field display apparatus for a motor vehicle comprising:

an autostereoscopic planar pixel arrangement for generating a projection light beam with display content, and a reflection-suppressing deflection arrangement arranged on the planar pixel arrangement, wherein the reflection-suppressing deflection arrangement comprises one or more planar reflection surfaces, which extend along the planar pixel arrangement at a predefined acute angle to the planar pixel arrangement and parallel to one another, for purposes of deflecting the generated projection light beam with the display content and projecting the generated projection light beam with the display content on a partly transparent reflecting projection screen of the motor vehicle such that a virtual display image superimposed into a visual field of a user is generated behind the projection screen, the method comprising:

providing at least one surroundings and/or user parameter; and switching between at least two qualitatively different 3D, 2D and/or monocular modes of operation of the planar pixel arrangement on the basis of the surroundings and/or user parameters provided, for purposes of adapting the virtual display image to qualitative changes in operation in relation to the surroundings and/or the user of the visual field display apparatus, wherein when a region of the planar pixel arrangement is switched from a 3D mode of operation to a monocular mode of operation, a brightness for said region is increased, and/or portions of said region are switched to monocular modes of operation provided for different eyes of the user, wherein, a mixed operation of a 3D mode of operation with a monocular mode of operation is activated, in which large-area virtual objects are represented in 3D and smaller and/or finer virtual objects are represented in monocular fashion.

15. A control unit for a visual field display apparatus, comprising:

a processor and associated memory operatively configured to automatically:

provide at least one surroundings and/or user parameter; and switch between at least two qualitatively different 3D, 2D and/or monocular modes of operation of a planar pixel arrangement on the basis of the surroundings and/or user parameters provided, for purposes of adapting a virtual display image to qualitative changes in operation in relation to the surroundings and/or the user of the visual field display apparatus, wherein the visual field display apparatus comprises:

an autostereoscopic planar pixel arrangement for generating a projection light beam with display content, and a reflection-suppressing deflection arrangement arranged on the planar pixel arrangement, wherein the reflection-suppressing deflection arrangement comprises one or more planar reflection surfaces, which extend along the planar pixel arrangement at a predefined acute angle to the planar pixel arrangement and parallel to one another, for purposes of deflecting the generated projection light beam with the display content and projecting the generated projection light beam with the display content on a partly transparent reflecting projection screen of the motor vehicle such that a virtual display image superimposed into a visual field of a user is generated behind the projection screen, wherein when a region of the planar pixel arrangement is switched from a 3D mode of operation to a monocular mode of operation, a brightness for said region is increased, and/or portions of said region are switched to monocular modes of operation provided for different eyes of the user, wherein, a mixed operation of a 3D mode of operation with a monocular mode of operation is activated, in which large-area virtual objects are represented in 3D and smaller and/or finer virtual objects are represented in monocular fashion.

\* \* \* \* \*